Oct. 31, 1933.  R. HAMILTON  1,932,662
MACHINE FOR GRADING EGGS BY WEIGHT
Filed Jan. 16, 1930  2 Sheets-Sheet 1
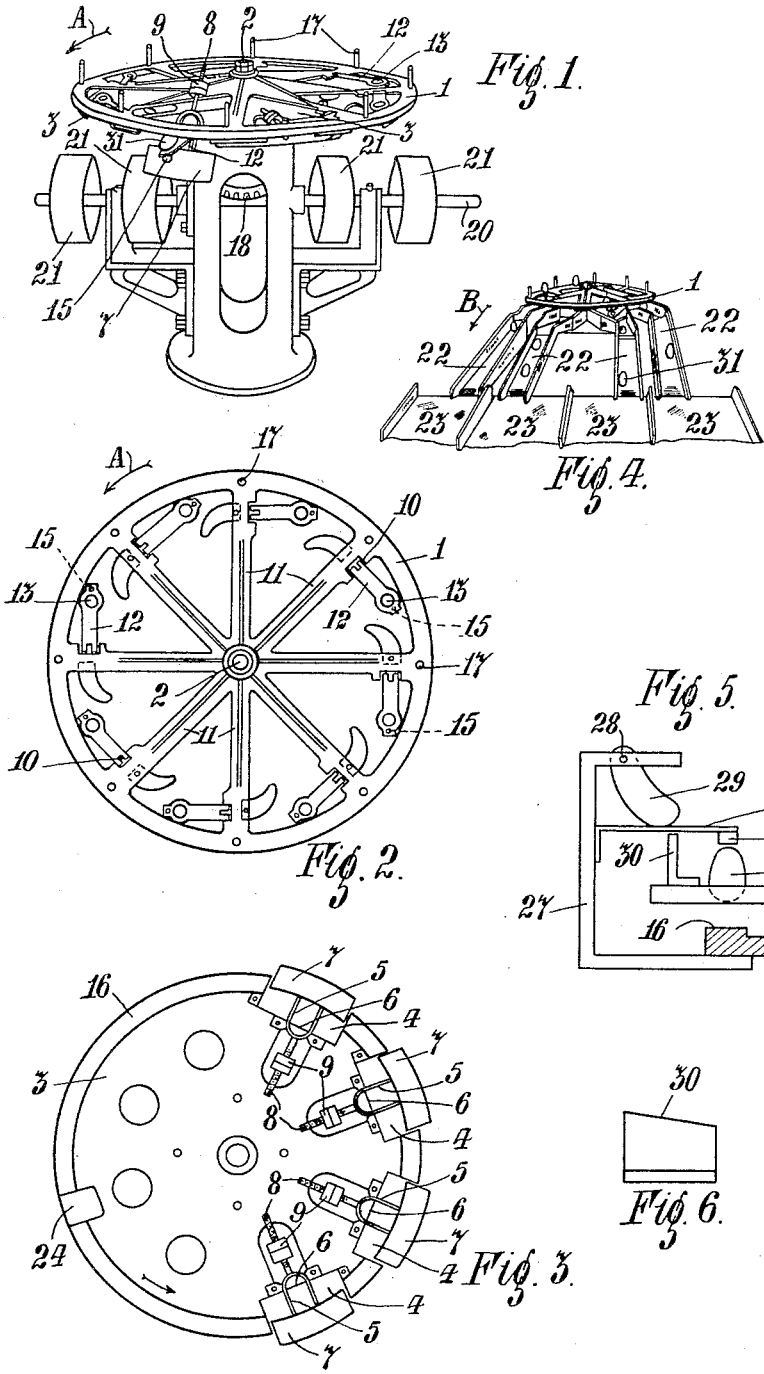

Oct. 31, 1933.  R. HAMILTON  1,932,662
MACHINE FOR GRADING EGGS BY WEIGHT
Filed Jan. 16, 1930  2 Sheets-Sheet 2
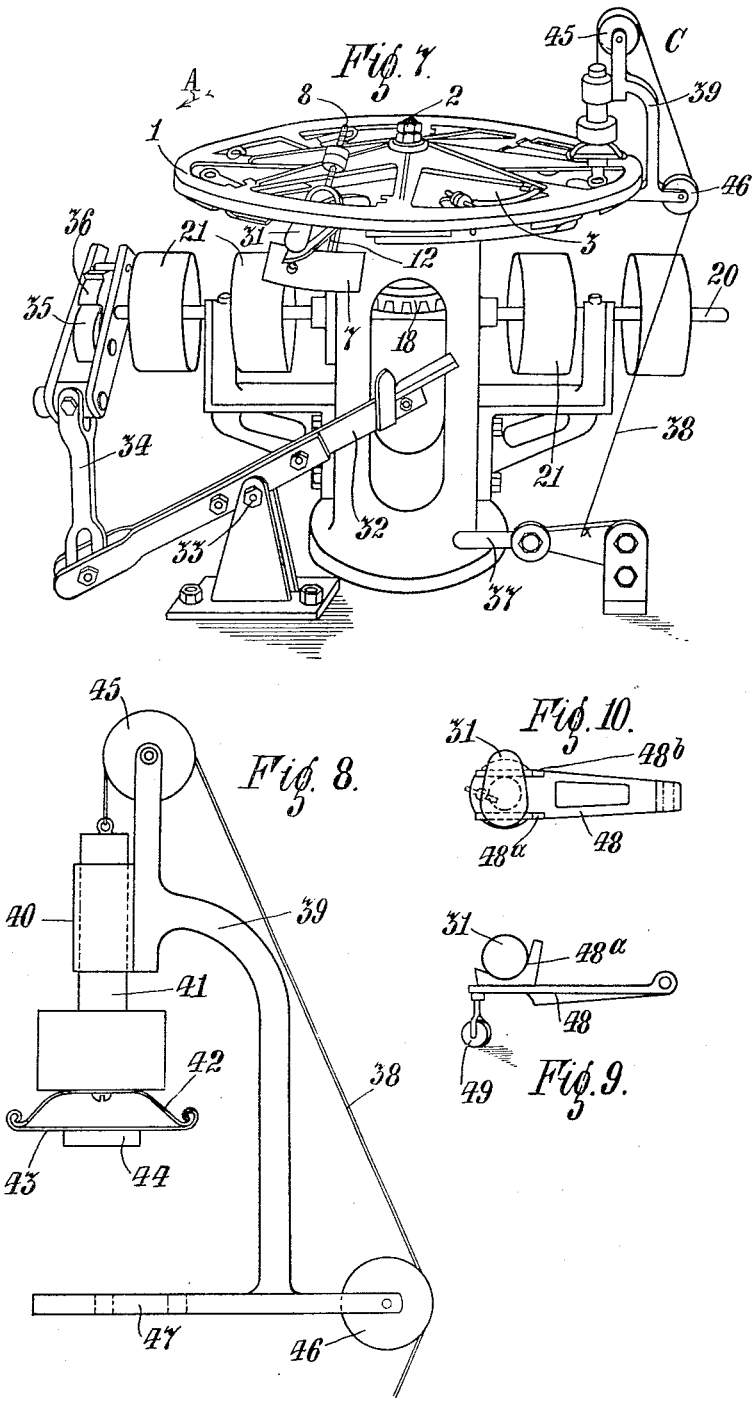

Patented Oct. 31, 1933

1,932,662

UNITED STATES PATENT OFFICE 1,932,662

MACHINE FOR GRADING EGGS BY WEIGHT

Richard Hamilton, Raphoe, Irish Free State

Application January 16, 1930, Serial No. 421,252, and in the Irish Free State May 7, 1929

6 Claims. (Cl. 209—121)

This invention relates to apparatus for grading eggs by weight and has for an object to provide an apparatus by which the grading of eggs according to weight may be effected with a minimum of labour and breakage and which renders practicable the sale of eggs by the pound or other unit of weight with so many to the pound or other unit, i. e., weight number.

An apparatus in accordance with the invention comprises a turn-table or wheel revoluble on a vertical axis manually or by power and carrying a plurality of holders or spoons or the like adapted to receive the eggs to be graded, and engageable, in the rotation of the turn-table, with variably loaded lever balances or the like disposed beneath the turn-table, the arrangement being such that when a holder or spoon carrying an egg of a given weight engages a balance adjusted to that weight, the balance and therewith the holder or spoon are automatically tipped and the egg ejected, for transference to a collector for eggs of that weight. It is understood that the loading of the levers decreases (that is, the sensitivity increases) progressively considered in the direction of rotation.

The holders or spoons are hinged to the turn-table or wheel and each presents at its free end a receptacle for the egg to be graded.

The lever balances are pivoted to a stationary disc disposed beneath the turn-table and presenting an upturned peripheral rim interrupted at spaced points occupied by scale plates or the like carried by the lever balances. The upturned rim forms a track for a ball castor or the like carried on the free end of each holder or spoon, the arrangement being such that, in the rotation of the turn-table, the holders or spoons and thereon the eggs to be graded, successively traverse the scale plates.

The eggs may be deposited on rubber cushions or the like whence they roll on to conveyor bands which are operatively connected to a shaft carrying the turn-table and which convey the eggs to trays or the like.

A separate conveyor band is provided for each grade of eggs.

Egg-grading apparatus constructed in accordance with the invention is illustrated, simply by way of example, in the accompanying drawings in which Fig. 1 is a perspective view showing the general arrangement of one form of the apparatus; Fig. 2 is a plan view of the turn-table or wheel shown in Fig. 1. Fig. 3 is a plan view of the stationary disc shown in Fig. 1. Fig. 4 is a perspective view showing the apparatus and associated conveyor bands; Figs. 5 and 6 are fragmentary detail views showing egg-stamping means. Fig. 7 shows a modified form of the apparatus shown in Fig. 1; Fig. 8 is a view of a modified form of egg stamp; and Figs. 9 and 10 are respectively elevation and plan of a modified form of egg holder or spoon.

Like references refer to like parts in the various figures.

Referring particularly to Figs. 1 to 6, the apparatus shown comprises a spider wheel 1 mounted for rotation on a vertical axis, being carried by a vertical shaft 2. Coaxial with and disposed beneath the wheel 1 is a stationary disc 3 formed with slots 4 in each of which is located a lever balance device including a fork 5 pivoted between its ends at 6 to the disc 3 and carrying on its outer end a scale plate 7. Integral with the fork 5 on the side of the pivot 6 remote from the plate 7 is a screw-threaded rod 8 carrying nuts 9 constituting adjustable counterweights for the lever balance device. Hinged at 10 to the radial spokes 11 of the wheel 1 are egg-holders or spoons 12 each presenting at its free end an egg-receiving aperture or pocket 13 and each having a depending runner or castor 15. The disposition of the egg-holder 12 is such that, in the rotation of the wheel 1 and therewith of the egg-holders, the castors 15 engage an upstanding rim 16 formed on the periphery of the disc 3 and presenting a circular track interrupted by the slots 4, that is, at the weighing stations, and, when the egg-holders are in register with said slots, the castors 15 engage the upper faces of the scale plates 7 whereby the eggs are "weighed". When an egg and its spoon tip one of the scale plates 7, the egg falls off the spoon and passes to one of the conveyor bands 22 hereinafter mentioned.

Numeral 17 denotes handles upstanding from the rim of the wheel 1 by means of which rotary movement may be imparted to the wheel. Secured to the shaft 2 beneath the disc 3 is a bevel gear 18 meshing with a bevel gear (not shown) secured to a transverse shaft 20 carrying pulleys 21 wrapped by conveyor bands 22 (Fig. 4) extending to other pulleys (not shown), the arrangement being such that when the wheel 1 is rotated in the direction indicated by the arrow A (Fig. 2) the upper flights of the conveyor bands are driven in the direction indicated by the arrow B (Fig. 4). In the embodiment illustrated there are four conveyor bands 22 disposed substantially directly beneath the four lever balance devices.

Numeral 23 denotes egg-receiving trays located at the ends of the conveyor bands 22 remote from the apparatus.

To enable the eggs in the holders or spoons to be subjected to an optical test there is provided at the periphery of the disc 3, so that the eggs may be brought successively into vertical register therewith, a glazed aperture 24 beneath which is located a source of light such as an incandescent lamp bulb. Instead, a source of light may be located above the path of the eggs on the wheel, the light being arranged to play on the eggs as they pass.

For stamping the eggs in the holders or spoons there is provided a blade spring 25, (Fig. 5) carrying at its free end a stamp 26 adapted to contact in the rotation of the wheel 1, with the upper ends of the eggs. The spring 25 is carried by an upstanding bracket 27 fixed to the disc 3 and pivotally supporting at 28 a depending weight 29 engaging the spring 25. Secured to the wheel 1 adjacent to each egg holder or spoon is a cam 30 engageable in the rotation of the wheel with the spring 25 whereby the stamp 26 is first raised and then allowed to drop on to the egg 31 so as to produce an impression thereon, the weight 29 serving to damp excessive vibration of the spring.

In the apparatus shown in Figs. 7 to 10, the wheel 1 is rotated by means of a treadle lever 32 pivotally mounted at 33 and actuating, by means of a link 34 and pawl 35, a ratchet wheel 36 secured to the shaft 20. A modified form of egg stamp, indicated generally at C, is mounted adjacent the periphery of the wheel 1. The egg stamp is shown in greater detail in Fig. 8 and is actuated by a treadle 37, through a chain or cord 38.

The egg stamp shown in Fig. 8 comprises a bracket 39 having a tubular guide 40 in which is slidably mounted a weighted stamp 41 having a curved blade spring 42 secured to the lower end thereof. This blade spring has its ends coiled and has secured thereto a strip 43 of leather on which is mounted a rubber stamp proper 44. The cord 38 is attached to the upper end of the stamp 41 and passes over two guide pulleys 45, 46 freely mounted on the bracket 39. A slot 47 is provided in the base of the bracket 39 for bolting the same to the frame of the machine. The combination of the leather strip 43, spring 42 and rubber stamp proper 44 ensures that the eggs are well stamped, at the same time obviating breakage of the eggs.

The egg holder or spoon shown in Figs. 9 and 10 consists of a member 48 (preferably of aluminium) having two arcuate brackets 48ª, 48ᵇ, shaped to receive an egg 31. The end of each bracket nearer the free end of the member 48 is of less height than the other, as shown; this facilitates the passage of the egg from the spoon when the latter tips one of the scale plates 7. A small wheel 49 is pivotally mounted on the lower side of each spoon, for running on the rim 16.

I claim:—

1. In apparatus for grading eggs by weight, the combination of, a turntable revoluble about a vertical axis, a plurality of tippable levers articulated to said turntable in circular formation, a cup on the free end of each tippable lever adapted to receive an egg, the egg-receiving portion of said cup comprising a pair of upstanding arcuate brackets for supporting the egg, the end of each bracket nearer the free end of the lever being of less height than the other in order to permit easy passage of the egg from the cup when the tippable lever is tipped, a plurality of stationary lever balances arranged in circular formation below said tippable levers the sensitivity of successive lever balances increasing in the direction of movement of the tippable levers, a circular rim forming with the said lever balances a circular track on which the free ends of said levers ride, passing successively over the balances when relative rotation between the turntable and track takes place, an endless conveyor for each of said lever balances adapted to convey away gently and without breakage, eggs which pass from the tippable levers when they are tipped, and treadle operated pawl and ratchet mechanism for intermittently driving said turntable and conveyers.

2. In apparatus for grading eggs by weight, the combination of, a turntable revoluble in a horizontal plane, a plurality of tippable egg holders connected to said turntable, said egg holders extending and being tippable above axes radial to the axis of revolution of said turntable, means at the free end of each egg holder for permitting easy pasage of the egg therefrom when the holder is tipped, a plurality of lever balances of different loadings arranged below said turntable and extending substantially radially thereto, a track containing said lever balances and on which the free ends of the egg holders ride, passing over the balances when the turntable moves relative to the track, and mechanical means for conveying away eggs gently and without breakage when they are tipped from the egg holders.

3. In apparatus for grading eggs by weight, the combination of, a turntable revoluble about a vertical axis and having a series of openings thereon positioned equidistant from the axis of revolution, a plurality of egg-carrying tipping levers which pivot about axes extending substantially radially of said turntable, a horizontal stationary disc located below and concentrically with said turntable, a plurality of lever balances situated in peripheral openings in the disc and weighted at their inner ends and having scale plates at their outer ends, said balances being pivoted on said disc below said egg-carrying levers about axes substantially perpendicular to radially extending lines on said disc, the weighted inner ends of the balances resting while in the untipped position on said disc, a circular track at the periphery of said disc over which the free ends of the egg-carrying levers ride, said track being completed at the peripheral openings in the disc by said scale plates, whereby, when a lever carrying an egg of a given weight passes on to a balance of the same loading, the lever and the balance both tip about their respective axes, the inner end of the balance being enabled to move upwardly while tipping by virtue of the fact that it registers with one of the openings in the turntable, and when the lever tips the egg is automatically ejected to a receptacle for eggs of that weight.

4. In apparatus for grading eggs by weight, the combination of, a horizontal stationary disc with a plurality of peripheral openings therein, a plurality of differently loaded lever balances weighted at their inner ends and having scale plates at their outer ends, said balances being situated in said openings and pivoted to said disc so as to tip in a substantially radial direction, the weighted inner ends of the balances resting while in the untipped position on said disc, a turntable revoluble about a vertical axis and located concentrically with said disc, said turntable having radial spokes and a series of openings between said spokes, into which the inner ends of said balances are adapted to move when the balances tip, a plurality of egg-carrying tipping levers each having an egg holder at the free end thereof said tipping levers pivoting about axes extending substantially radially of said turntable, a circular rim at the periphery of said disc forming together with said scale plates a track over which the free ends of said egg-carrying levers are adapted to ride, whereby, when a lever carrying an egg of a given weight passes on to a balance of the same loading, the lever and the balance both tip about their respective axes at right angles to each other and the egg is automatically ejected into a receptacle for eggs of that weight.

5. In apparatus for grading eggs by weight, the combination of, a horizontal stationary disc with a plurality of peripheral openings therein, a plurality of lever balances weighted at their inner ends and having scale plates at their outer ends, said balances being situated in said openings, pivoted to said disc so as to tip in a substantially radial direction, and arranged in order of increasing sensitivity, the weighted inner ends of the balances resting while in the untipped position on said disc, a turntable revoluble about a vertical axis and located concentrically with said disc, said turntable having a series of openings thereon positioned equidistant from the axis of revolution thereof, and into which the inner ends of said balances are adapted to move when tipping, a plurality of egg-carrying tipping levers each having an egg holder on the free end thereof, said levers being articulated to said turntable and pivoting about axes extending substantially radially of said turntable, said disc forming together with said scale plates a track on which the free ends of the egg-carrying levers ride, whereby, when a lever carrying an egg of a given weight passes on to a balance of the same loading, the lever and the balance both tip about their respective axes at right angles to each other and the egg is ejected into a receptacle for eggs of that weight.

6. In apparatus for grading eggs by weight, the combination of, a turntable revoluble about a vertical axis, a plurality of tippable levers articulated to said turntable in circular formation, a cup on the free end of each tippable lever adapted to receive an egg, the egg-receiving portion of said cup comprising a pair of upstanding arcuate brackets for supporting the egg, the end of each bracket nearer the free end of the lever being of less height than the other in order to permit easy passage of the egg from the cup when the tippable lever is tipped, a plurality of stationary lever balances arranged in circular formation below said tippable levers the sensitivity of successive lever balances increasing in the direction of movement of the tippable levers, a circular rim forming with the said lever balances a circular track on which the free ends of said levers ride, passing successively over the balances when relative rotation between the turntable and track takes place, an endless conveyor for each of said lever balances adapted to convey away gently and without breakage, eggs which pass from the tippable levers when they are tipped, and means for driving said turntable and conveyors.

RICHARD HAMILTON.